United States Patent
Le Chevalier et al.

(10) Patent No.: US 9,104,892 B2
(45) Date of Patent: Aug. 11, 2015

(54) SOCIAL SHARING OF MULTILAYERED DOCUMENT

(71) Applicant: Chegg, Inc., Santa Clara, CA (US)

(72) Inventors: Vincent Le Chevalier, San Jose, CA (US); Ohad Eder-Pressman, San Francisco, CA (US); Shannyn Timrott, San Jose, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 324 days.

(21) Appl. No.: 13/723,048

(22) Filed: Dec. 20, 2012

(65) Prior Publication Data

US 2014/0020115 A1 Jan. 16, 2014

Related U.S. Application Data

(60) Provisional application No. 61/670,994, filed on Jul. 12, 2012.

(51) Int. Cl.
*G06F 21/30* (2013.01)
*G06F 21/70* (2013.01)

(52) U.S. Cl.
CPC ....................................... *G06F 21/70* (2013.01)

(58) Field of Classification Search
CPC ...... G06Q 50/01; G06Q 50/20; G06F 17/241; G06F 17/212; H04L 51/10; H04L 63/08; H04L 67/20
USPC ......................................................... 715/230
See application file for complete search history.

(56) References Cited

U.S. PATENT DOCUMENTS

| | | | |
|---|---|---|---|
| 6,279,014 B1 | 8/2001 | Schilit et al. | |
| 7,945,852 B1 * | 5/2011 | Pilskalns | 715/230 |
| 8,875,011 B2 * | 10/2014 | Sitrick et al. | 715/231 |
| 2001/0042098 A1 | 11/2001 | Gupta et al. | |
| 2002/0054138 A1 | 5/2002 | Hennum | |
| 2002/0083096 A1 | 6/2002 | Hsu et al. | |
| 2003/0076352 A1 | 4/2003 | Uhlig et al. | |
| 2005/0010865 A1 | 1/2005 | Kuppusamy et al. | |
| 2006/0253449 A1 | 11/2006 | Williamson et al. | |
| 2006/0277482 A1 | 12/2006 | Hoffman et al. | |
| 2007/0130527 A1 | 6/2007 | Kim | |
| 2007/0198534 A1 * | 8/2007 | Hon et al. | 707/10 |
| 2007/0294614 A1 | 12/2007 | Jacquin et al. | |
| 2008/0168073 A1 * | 7/2008 | Siegel et al. | 707/100 |
| 2008/0222552 A1 | 9/2008 | Batarseh et al. | |
| 2008/0235142 A1 | 9/2008 | Gonze et al. | |
| 2008/0256113 A1 | 10/2008 | Rasmussen et al. | |
| 2009/0070661 A1 | 3/2009 | van den Dungen et al. | |

(Continued)

*Primary Examiner* — Eleni Shiferaw
*Assistant Examiner* — Paul Callahan
(74) *Attorney, Agent, or Firm* — Fenwick & West LLP

(57) ABSTRACT

A method for sharing multilayered electronic content among users of a social network within a digital education platform is provided. In one embodiment, the digital education platform allows a user to create user-generated content associated with a multilayered document and share the content with other users in an education social network. The user can specify which users to share the user-generated content and assign an access right to each of those users that may access the user-generated content. When the digital education platform receives a request to access the user-generated content from a certain user, an access right associated with that user for the user-generated content is determined and access is granted according to the access right.

20 Claims, 5 Drawing Sheets

(56) References Cited

U.S. PATENT DOCUMENTS

| | | |
|---|---|---|
| 2009/0144277 A1 | 6/2009 | Trutner et al. |
| 2009/0235280 A1 | 9/2009 | Tannier et al. |
| 2009/0265607 A1* | 10/2009 | Raz et al. ............ 715/233 |
| 2009/0307762 A1* | 12/2009 | Cudd, Jr. ............ 726/5 |
| 2009/0327855 A1* | 12/2009 | Le ............ 715/230 |
| 2010/0011282 A1 | 1/2010 | Dollard et al. |
| 2010/0299717 A1* | 11/2010 | Nasirifard et al. ............ 726/1 |
| 2011/0022449 A1 | 1/2011 | Bourne |
| 2011/0078251 A1 | 3/2011 | Cross et al. |
| 2011/0113320 A1* | 5/2011 | Neff et al. ............ 715/230 |
| 2011/0239158 A1 | 9/2011 | Barraclough et al. |
| 2012/0036423 A1 | 2/2012 | Haynes et al. |
| 2012/0110082 A1 | 5/2012 | Brown et al. |
| 2012/0159313 A1* | 6/2012 | Dejean ............ 715/247 |
| 2012/0221938 A1* | 8/2012 | Patterson et al. ............ 715/232 |
| 2012/0233154 A1 | 9/2012 | Walther et al. |
| 2012/0260283 A1 | 10/2012 | Purohit |
| 2013/0137078 A1* | 5/2013 | Shustorovich et al. ....... 434/362 |
| 2014/0019438 A1 | 1/2014 | Le Chevalier et al. |

* cited by examiner

SOCIAL SHARING OF MULTILAYERED DOCUMENT

CROSS-REFERENCE TO RELATED APPLICATION

This application claims the benefit of U.S. Provisional Application No. 61/670,994, filed Jul. 12, 2012, which is incorporated by reference in its entirety.

This application is related to U.S. patent application Ser. No. 61/741,771, U.S. Patent Application No. 61/741,773, and U.S. patent application Ser. No. 13/542,249, which are incorporated by reference in their entirety.

BACKGROUND

1. Field of the Invention

This invention relates to sharing multilayered electronic content among users of a social network within a digital education platform.

2. Description of the Related Art

The rapid shift to mobile Internet services is bringing content offerings to an increasingly larger number of connected devices. Experiences previously limited to a single device are now accessible across multiple devices as high volume consumer electronic platforms such as Smart Phones, tablets, eReaders, game systems, and Internet TVs have become new channels to receive digital education documents and services. Popular electronic education book services leverage standardized publishing formats to seamlessly integrate and synchronize digital document reading experiences across consumer devices.

But while providing excellent user reading experience for this new digital medium remains a focus of the commercially available eReading education systems and applications, it has been so far much more difficult to fully integrate other related education activities, such as note taking and sharing. The simple action of writing a note into the border of a document remains a challenging proposition for a variety of reasons in most digital reading systems. In addition, as new digital education content services are progressively embedded within the original document, it becomes increasingly difficult to create, edit, and organize these additional content layers into a single education experience. As digital documents are shifting from a static model to a connected one where related, personalized and other social content are being aggregated dynamically within the original document, it becomes strategic for education platforms and their distribution systems to be able to properly author and manage these new individual content layers among a plurality of users.

SUMMARY

Embodiments of the present invention provide a method, a storage medium and a system for sharing user-generated content in a multilayered document among users of a social network within a digital education platform. The multilayered document comprises a core layer of one or more pages of an education publication, ingested by a publishing platform and transformed into a format suitable for web-based publication. One or more additional layers of the education document comprise supplemental content associated with the pages of the core layer. Each layer of the document has unique characteristics relating to its file size, spatial dimensions, update frequency, and/or interactivity. The multilayered document is distributed by the digital education platform to eReading browser applications executing on one or more user devices.

In one embodiment, the digital education platform allows a user to create user-generated content associated with a multilayered document and share the content with other users in an education social network. The user can specify which users to share the user-generated content and assign an access right to each of those users that may access the user-generated content. When the digital education platform receives a request to access the user-generated content from a certain user, an access right associated with that user for the user-generated content is determined and access is granted according to the access right.

The features and advantages described in this specification are not all-inclusive and, in particular, many additional features and advantages will be apparent to one of ordinary skill in the art in view of the drawings, specification, and claims.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

Embodiments of the present invention provide a system and method for sharing user-generated content associated with a multilayered digital document. The system is built upon an educational digital publishing and reading platform configured to aggregate, manage, and distribute multilayered content. The digital education platform also manages an education social network that provides education and eReading services to the participating users, such as teachers, students and authors. The content in modern markup language format can be downloaded to general eReading applications (e.g., a HTML5 compatible browser) on a page by page basis and can be easily extended to support a multilayered structure so as to incorporate supplemental content in additional layers. Users of the digital education platform can access multilayered documents via any popular web browser applications. Users may also join an education social network for interacting with each other and sharing content such as assignments or personalized notes.

Figure 1:
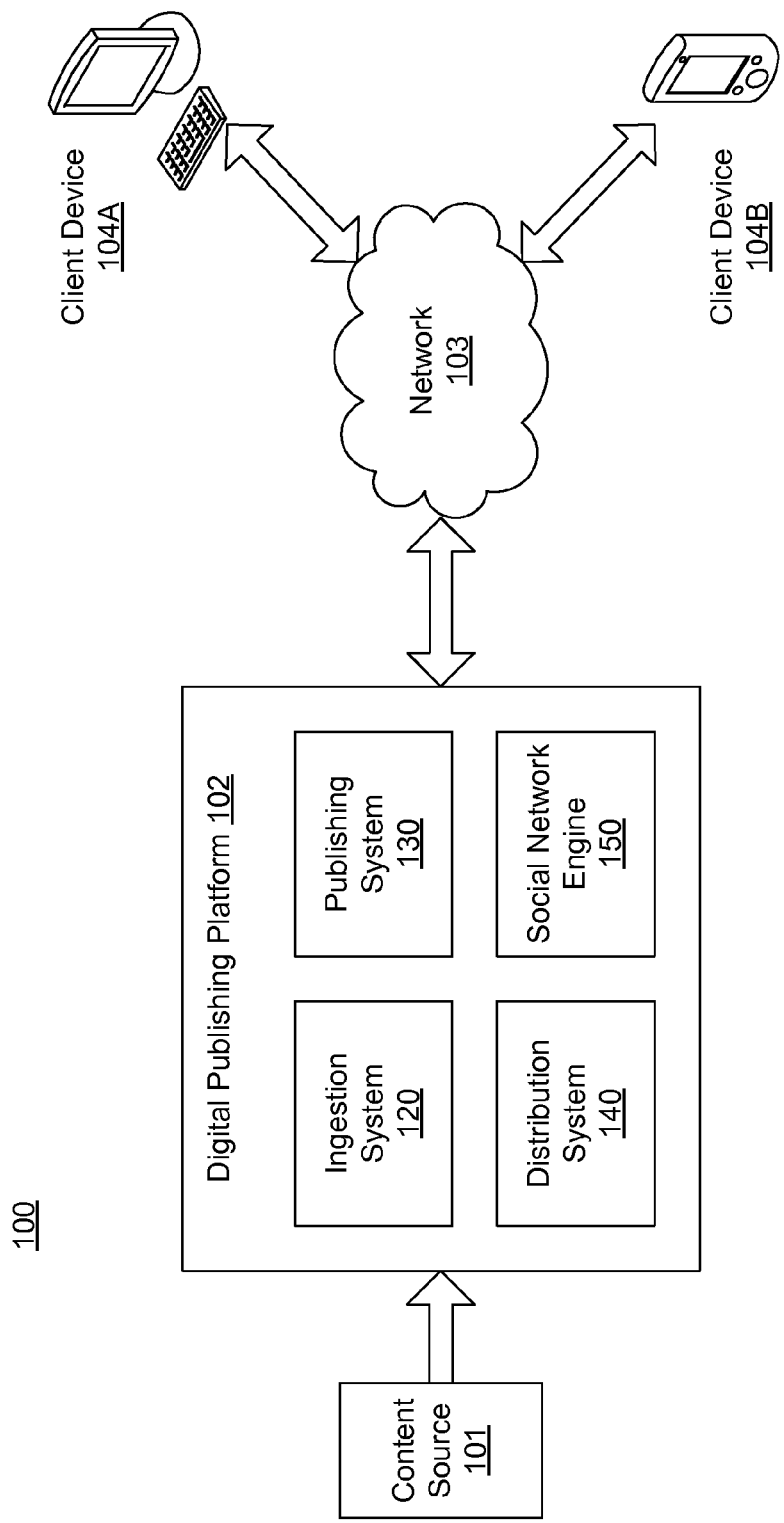
FIG. 1 is a high-level block diagram illustrating a system environment 100 for an educational digital content publication and reading platform according to one embodiment.

FIG. 1 is a high-level block diagram illustrating an environment 100 for the educational digital publishing and reading platform, which comprises content sources 101, an educational digital publishing and reading platform 102 (hereinafter digital education platform), a network 103, and one or more client devices 104. The network 103 is typically a content delivery network (CDN) built on the Internet, but may include any network, including but not limited to a LAN, a MAN, a WAN, a mobile wired or wireless network, a private network, or a virtual private network. The client devices 104 access the content from eReading browser applications running on computing devices connected to the network 103. The client devices 104 include a personal computer, such as a desktop, laptop, or tablet computer, a personal digital assistant, a mobile or smart phone, or a television "set-top box" using a client web application.

The content sources 101 include digital and printed content automatically gathered and aggregated from a large number of publishers, categories, and partners. Examples of content include textbooks, trade books, magazines, newspapers, user-generated content, web content, and advertising content. Content is automatically collected from various content sources 101 into a formalized staging environment.

The digital education platform 102 aggregates, validates, transforms, packages, and monetizes the content collected by the content source 101 into a number of services, prior to distribution to the client devices 104 over the network 103. The platform comprises four modules: ingestion system 120, publishing system 130, distribution system 140, and social network engine 150. Other embodiments may include more or fewer and/or different modules.

The ingestion system 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the education document may have a plurality of pages organized into chapters, which could be further divided into one or more sub-chapters. Each page may have text, images, tables, graphs, or other items distributed across the page.

After ingestion, the documents are passed to the publishing system 130. If the document ingested by the ingestion module 120 is not in a markup language format, the publishing system 130 automatically identifies, extracts, and indexes all the key elements and composition of the document to reconstruct it into a modern, flexible, and interactive markup language document, for example, an HTML5 web page well-suited for distribution across various computing devices. The transformed content preserves the original page structure including pagination, number of columns and arrangement of paragraphs, placement and appearance of graphics, titles and captions, and fonts used, regardless of the original format of the source content and complexity of the layout of the original document. In one embodiment, the publishing system 130 reconstructs published documents so as to accommodate dynamic add-ons, such as related content, while maintaining page fidelity to the original document.

During reconstruction, the page structure information can be assembled into a document-specific table of contents describing locations of chapter headings and sub-chapter headings within the document, as well as locations of content within each heading. The document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure.

After reconstructing a document, the distribution system 140 packages content of the publishing platform 102 for delivery, uploads the content to content distribution networks, and makes the content available to end-users based on the content's digital rights management policies. In one embodiment, the distribution system 140 includes a content protection subsystem, which is interfaced between the distribution system 140 and the eReading browser applications running on the client devices 104, essentially integrating the digital content management (DCM), content delivery network (CDN), delivery modules and eReading data collection interface for capturing and serving all users' content requests. By having content served dynamically and mostly on-demand, the system effectively authorizes the download of one page of content at a time through time sensitive dedicated URLs which only stay valid for a limited time, for example, a few minutes, all under control of the platform service provider.

The distribution system 140 may also aggregate additional content layers from numerous sources. These layers, including related content, user-generated content, advertising content, and social content, may be added to the document to create a dynamic, multilayered education document. For example, related content may comprise material supplementing the core document, such as study guides, self-testing material, solutions manuals, glossaries, or journal articles. User-generated content includes annotations made by a user during an eReading session, such as highlighting or notes, as well as assignments created by teachers and distributed to students. In one embodiment, user-generated content may be self-published by a user and made available to other users as a related content layer. Advertising content may be uploaded by advertisers or advertising agencies to the publishing platform, such that advertising content may be displayed with the document. Social content may be uploaded to the digital education platform by the user or by other users (e.g., classmates, teachers, authors, etc.) from the user's social connections. Examples of social content include interactions between users related to the document and content shared by friends in the user's social networks. More details of the multilayered digital document are described with reference to FIG. 2 below.

The social network engine 150 creates and manages an education social network among users of the digital education platform. For each individual user, the social network engine 150 automatically discovers and recommends social connections to the user based on user profile and other information about the user. For example, the social networking engine 150 may identify potential social connections for a student user, such as other students registered for the same or similar classes, instructors of the classes for which the student registered, and authors of the textbooks that the student reads from the student's school and other schools. These identified social connections are then recommended to the student, who may connect to them by accepting and joining the education social network managed by the social network engine 150. The social network engine 150 is described in greater detail with reference to FIG. 3 below.

Multilayered Document

After a document is ingested by the digital education platform, the document can be extended into a multilayer document to incorporate supplemental content, such as user-generated content and references to the ingested content. The multilayered document comprises a core document layer and one or more additional content layers. The core layer is a standalone document comprising one or more pages of a publication, ingested by the digital education platform and transformed into a markup language format while preserving the page fidelity. The one or more additional layers of the document include supplemental content associated with the pages of the core layer. The document is distributed by the digital education platform to eReading browser applications executing on one or more client devices, which render the content for display on each device. Each layer of the document has unique characteristics relating to its file size, spatial dimensions, update frequency, and/or interactivity.

Figure 2:
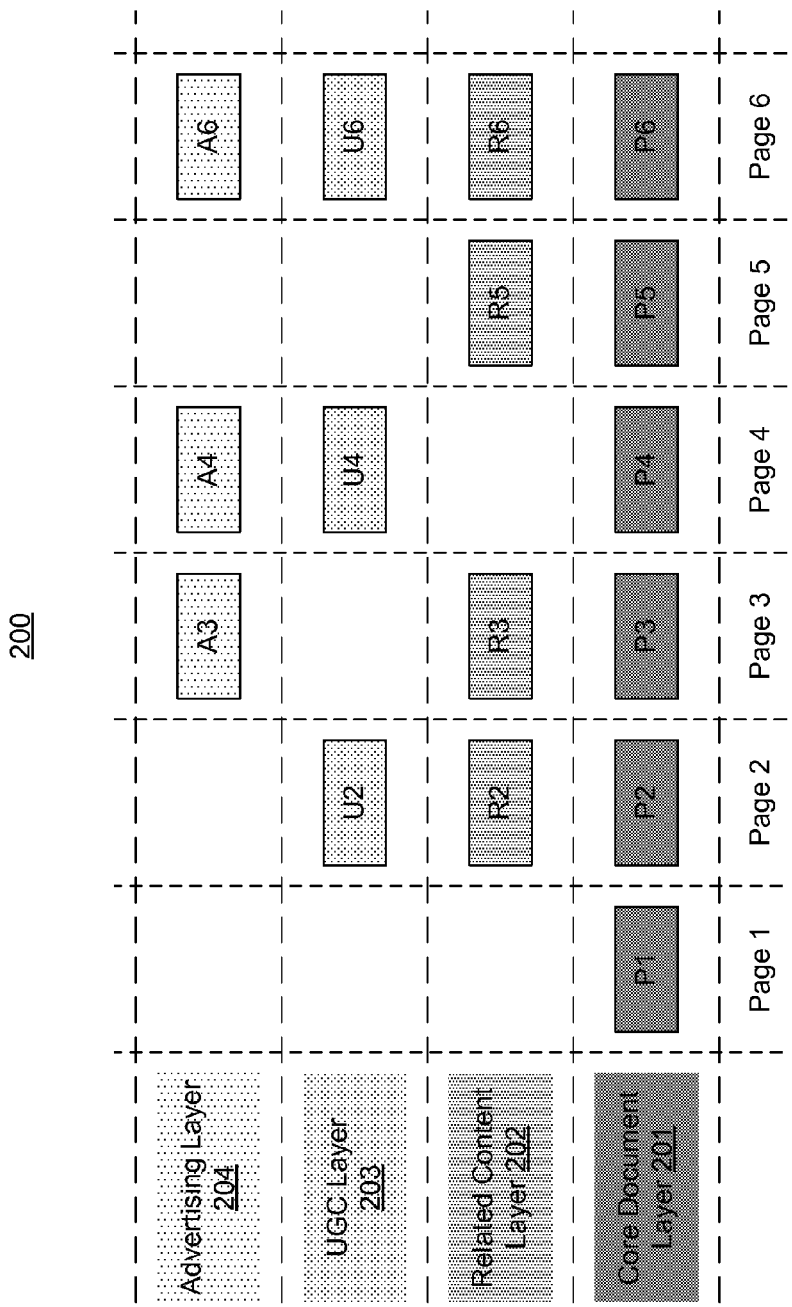
FIG. 2 is a block diagram illustrating an example of multilayered digital education document according to one embodiment.

FIG. 2 is a block diagram illustrating an example of multilayered digital document according to one embodiment. It illustrates pages of an original document (Page 1-Page 6) from an original document in a core document layer 201, a related content layer 202, a user-generated content (UGC) layer 203, and an advertising layer 204. The core document layer 201 contains document pages ingested and/or reconstructed by the digital education platform 102, which include all the page elements (e.g., text, graphs, charts, images, and tables), page info (e.g., pagination, arrangement, and placement) and metadata (e.g., element type, description, pricing, and terms). The related content layer 202, UGC 203, and advertising layer 204 are the supplemental layers that may be shared, purchased or downloaded in conjunction with the core layer 201.

When converting ingested data, the publisher of the digital education platform identifies additional content to supplement the converted core document. Examples of the additional content include, but are not limited to, study guides, self-testing material, solution manuals, glossaries, websites, among other references, that are related to the content of the document. The digital education platform adds the additional content to a related content layer of the converted document and associates each item of the related content with a page of the document where the content item is to be displayed. For example in FIG. 2, related content R2 and R3 are associated with Page 2 and 3, respectively.

The user-generated content, on the other hand, may be dynamically created and updated by users of the digital education platform during reading sessions. As the users interact with the document rendered by the eReading browser application, a new layer of user-generated content can be created. User-generated content includes annotations such as highlights, underlines, comments, notes, and assignments made by users on the pages of the markup language document. User-generated content is associated with its corresponding markup language document pages and can be rendered alongside with its associated pages. In one embodiment, since user-generated content may be updated after it is created, a UGC item is stored with metadata, which includes timestamps that capture the time of its creation and following modifications, so that the time of creation and time of modifications can be distinguished. For example, page 2, 4, and 6 in FIG. 2 contain user-generated content.

The advertisement content may be uploaded by advertisers or advertising agencies to the digital education platform. The advertising layer is also dynamic in that the advertisements may be updated during user web sessions. Advertisements delivered to a user may be selected by the digital education platform based on the document the user is interacting with and the user's activities. As the document accessed by the user is getting updated dynamically, or as the user's activities are shifting during the web sessions, the digital education platform may update the advertisements to be delivered to the user. In FIG. 2, for example, advertisements are present in the advertising layer 204 for the pages 3, 4 and 6.

Although only four layers are shown in the example in FIG. 2, multilayered documents may contain fewer or more and/or different layers of content. After a multilayered document is constructed, content distribution system 140 distributes content dynamically and on-demand through authenticated web sessions to users. Dedicated web sessions with time limits are initiated each time a user requests to access the multilayered document, and are unique for each combination of the requesting user, device activated, and requested multilayered document.

Education Social Network

The multilayered digital content documents distributed by the digital education platform to multiple users and user devices deliver a rich and comprehensive user experience compared to traditional platforms. Users not only interact with the multilayered content from a variety of content sources, but can also interact with each other. For example, users of the digital education platform may be interested in communicating with each other if they share common teachers, assignments, or exams. Additionally, teachers, teaching assistants and academic authors may be interested in communicating with each other and with students across different schools for feedbacks on their teaching methods, cycles or educational materials. This particular form of interactions helps organize the users of the digital education platform in a special kind of social network, which extends the traditional classrooms into the cyber space. Users may be connected to potentially unlimited number of other users in a cloud of virtual classrooms, thus forming an education social network for learning purposes.

In one embodiment, the social network engine 150 in the digital education platform 102 organizes users into an education social network and provides a variety of learning services to the participating users of the education social network. For example, students who have registered for a course and secured access to the mandatory textbook materials can communicate with each other in various ways, such as listening to online presentations, sharing user-generated notes, comments and references, working on assignments, and taking unit tests within the education social network.

The social network engine 150 may identify users of the digital education platform who may be interested in communicating with each other based on the student's course registration. The social network engine 150 collects the student's course registration information from the student, the educational institution offering the course, or third party services. The student's course registration information may include the student's major, grade level, classes and school. Each registered course is also associated with a syllabus, which provides information on the course's instructors, teaching assistants, textbooks assigned, authors of textbooks, and schedules and deadlines for assignments, homework, unit tests, exams, and projects. The information contained in the course registration and syllabus can be ingested by the digital education platform to identify contents and events that may be of interest to the users. In addition, the social network engine 150 can identify (students, teachers and authors) who share courses, therefore may be interested in communicating with each other. Those identified users are recommended to each other as potential connections by the social network engine 150 to form an education social network.

Additional information about the student, such as the student's school, college or university can be used to identify more social connections. For example, a student's potential connections can include other students who sit in different classrooms for a same required course, such as 'Biology 101,' or those registered for a related course to 'Biology 101.'

Furthermore, different universities may offer same or similar courses. Students from other schools, departments, colleges and universities that register for those courses may also be recommended as potential social connections. Similar and related courses can be identified based on similarities in course syllabus, textbook titles, and homework assignment by the digital education platform.

The social network engine 150 maintains a social graph for each user. In one embodiment, the social graph is a database comprising nodes and edges, where each node represents a user and each edge connecting two end nodes represents a social link between the corresponding users. Upon a potential connection recommended to a user by the digital education platform, the user can either accept or reject the recommendation to add the connection. If the users accept the recommended connection, the social network engine 150 adds a link between the user and the recommended connection to both users' social graphs. The student's social connections can be shown on a user interface of the eReading browser application along with the student's profile, schedule and registered syllabi.

Figure 3:
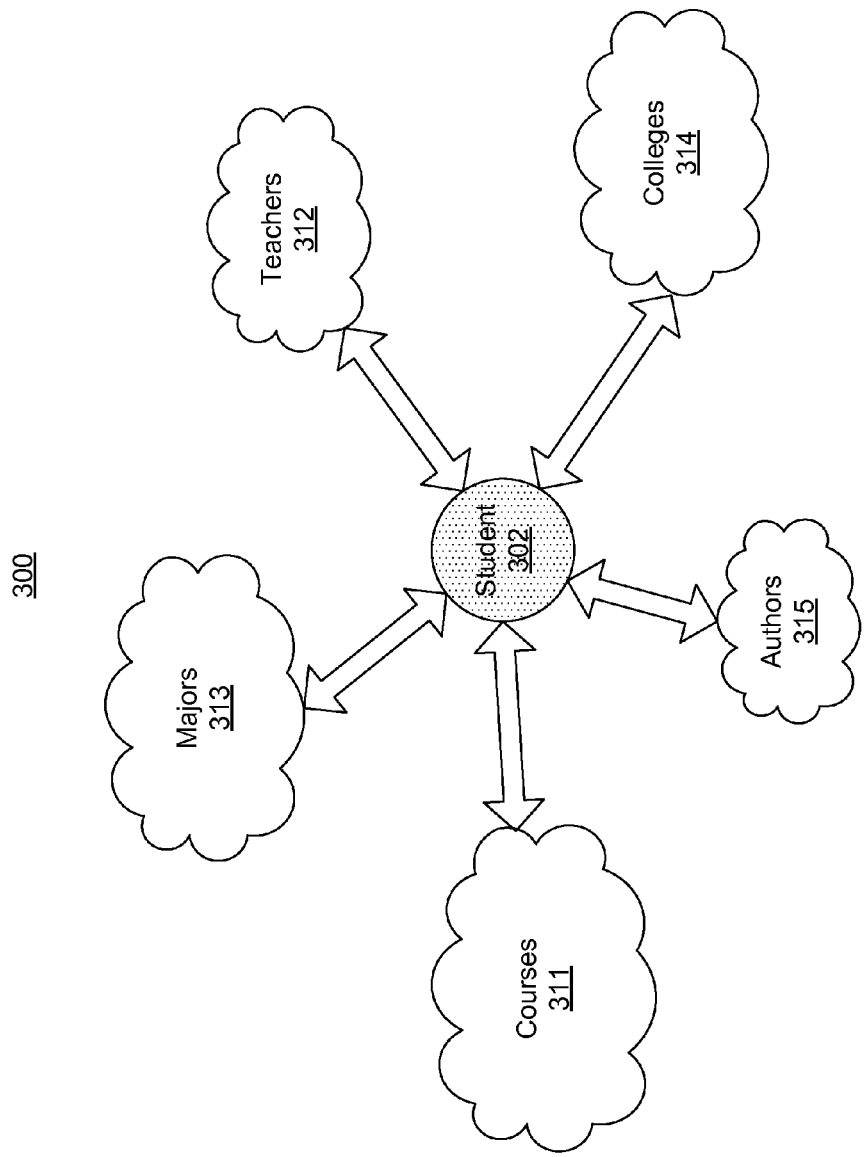
FIG. 3 is a block diagram illustrating a social graph generated by an education social networking engine for a student according to one embodiment.

FIG. 3 is a block diagram illustrating a social graph generated by the social networking engine 150 for a student 302 according to one embodiment. The student's social graph includes connections with teachers 312 of the courses that the student has registered for, academic authors 315 of textbooks that are assigned to the student as reading materials for the courses, and other students 311 who share the same courses, students 313 who have the same majors, and students 314 who attend the same school. As described above, other students 314 who share the same courses and majors as the student may be from different schools, colleges and universities. Therefore, the student's social graph within the digital education platform can become quite large. The digital education platform protects its users' privacy and permits its users to opt-in and out of the social service. The digital education platform also abides by the privacy policies and rules enacted set by educational institutions as well as other governing entity of the users.

Sharing Layered Content

The integration of social network behavior with markup language-based digital publishing services is changing the definition of a document by opening it up to multiple layers of content aggregated into a new and enhanced social learning experience. With social-based content and activities getting added to the overall document learning experience, eReading browser applications need to be able to manage the user experience requirements associated to the management, distribution and sharing of these new layers into coherent markup language document pages, specifically given the inherited constraints that eReader applications are operating under from within browser environments. By taking the original document and combining it with related content, user-generated content, advertising, social and other interactive material, paper document reading experience is transformed from a static and monolithic task into a customized, targeted, on-demand, social and interactive document experience that supports new business models for content publishers and service providers.

For instance, the digital education platform may provide services to users based on their connections with other users within the social network introduced by the platform. These services include, but not limited to, access to supplemental academic material (e.g., academic publications, assignments, targeted quiz and related course), notice of upcoming events (e.g., upcoming tests or exams, and book author's local speaking engagement), and targeted advertisements (e.g., coupons for local retail stores, and brand sales). The core of these social services, however, is the sharing of content between connected users bound by common activities via different communication channels.

To enable content sharing, users need to have licensing rights to the target multilayered content documents. In general, rights are defined by the owner of the content in publishing business. In case of a multilayered digital document, different layers of content may be owned by different owners, such as the publishers who own the copyright, the digital education platform who owns the service and distribution rights, and users who created user-generated content, hence the rights of it. Licensing rights are managed by the digital education platform and business rules applied to all aspects of education services.

Users who create content have the control of its usage, such as publishing, sharing, licensing, among other uses. Here, users who have the rights to share content are defined as primary users. Primary users may be those who are the owners of the content or those who have been authorized to share the content. Primary users can determine which other users may have access to the shared content and grant access rights to those users. Users who receive the access rights to the shared content are defined as secondary users. Primary users may grant access to individual users or user groups. In one embodiment, secondary users may join user groups that have the access rights to gain access to the shared content. Access rights granted to secondary users can be permanent, loosely time constrained, or strictly time-limited. Furthermore, secondary user may have permissions to read, write, or execute the shared content. In one embodiment, a secondary user may further share the content with his/her social connections. This downstream sharing may be disabled in other embodiments. A registered user in the education social network can be a primary user and secondary user at the same time. For example, a student may share his/her notes with other students, while access a master notes from a teacher of the class.

Access rights may be designated by the primary user when shared content is uploaded to the digital education platform or granted on-demand to secondary users. As a multilayered digital document is requested and dynamically rendered in an eReading browser application, primary users can select one or more document layer (e.g., a user-generated content layer) and authorize the sharing among the user's social connections. In one embodiment, by authoring sharing, the user effectively instructs the digital education platform to aggregate and add the user-generated content into the platform content catalog, making the user-generated content available for publishing and distribution. When other users request to access the shared content, the access rights of the requesting users are checked by the digital education platform. The user-generated content is accessible only to users authorized by the sharing user and access rights are enforced by the digital education platform authentication system.

Figure 4:
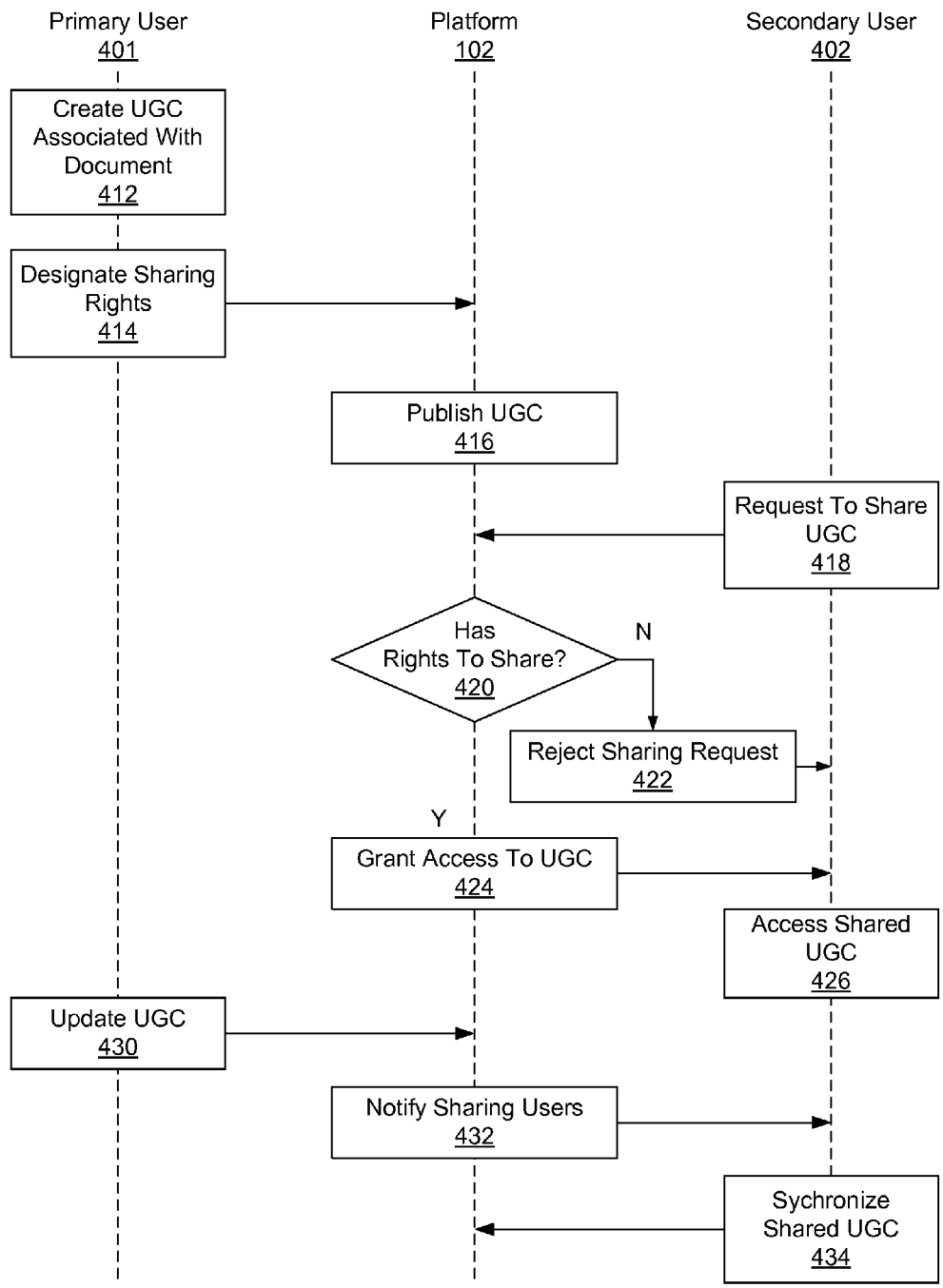
FIG. 4 is an example of event trace illustrating a method for sharing user-generated content according to one embodiment.

FIG. 4 is an example of event trace illustrating a method for sharing user-generated content according to one embodiment. The event trace involves three parties: the primary user 401, the digital education platform 102, and the secondary user 402. The primary user 401 is the user who creates (step 412) user-generated content, which is associated with a multilayered document. The primary user 401 then designates (step 414) sharing rights for the user-generated content, which is uploaded together with the user-generated content to a personal library of the user on the digital education platform 102 during the web session. The primary user 401 may assign different sharing rights to different layers of the user-generated content, and different sharing right to different secondary users or user groups. For example, a teacher may allow his or her class syllabus to be shared by all the students at school, while only sharing the teaching slides among students registered to the class. The access rights to the user-generated content may include, but not limited to, public or private access, time-constrained or non-time constrained access, permission to read, edit, re-share, review and comment on the user-generated content.

The digital education platform automatically uploads the user-generated content created by the primary user during eReading web sessions and stores the content in a personal library for the primary user 401. The user-generated content can be published (step 416) by the digital education platform and shared with other users of the platform as layers of the multilayered document. For example, the digital education platform makes the content available for sharing at dedicated uniform reference locators (URLs) under the sharing service. The URL may be accessible by those users who are allowed access rights by the primary user. Next, a secondary user 402 of the digital education platform sends (step 418) a request to access the user-generated content created by the primary user 401. Upon receiving the request, the digital education platform determines (step 420) whether the secondary user 402 has an access right to share the user-generated content. If not, the platform 102 rejects (step 422) the sharing request from the secondary user 402. Otherwise, the platform 102 grants (step 424) access of the user-generated content to the secondary user 402, who can then access (step 426) the shared user-generated content.

Later when the primary user 401 updates (step 430) the user-generated content, the update is uploaded and stored on the digital education platform 102. The platform 102 then notifies (step 432) the update to all the users who share the user-generated content. The secondary user 402 gets such an update notification and can then synchronize (step 434) his shared user-generated content with the platform 102 during the online eReading session.

Figure 5:
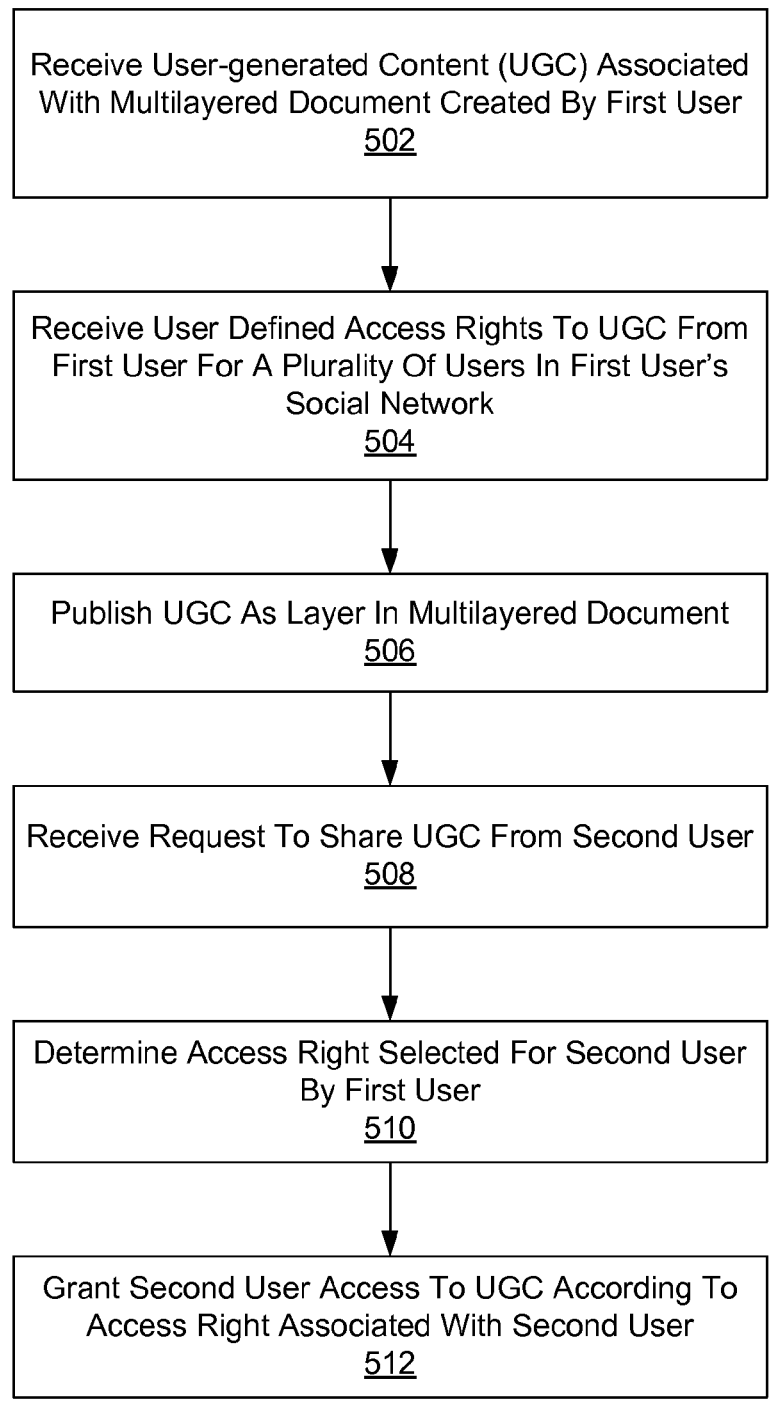
FIG. 5 is a flowchart illustrating a method for sharing user-generated content performed by the education platform according to one embodiment.

FIG. 5 is a flowchart illustrating a method for sharing user-generated content performed by the digital education platform according to one embodiment. In step 502, the digital education platform receives user-generated content created by a first user. The user-generated content generated by the first user is to be associated with a multilayered document. The multilayered document comprises a core layer and one or more additional layers, which include user-generated content created by the first user. For example, a multilayered textbook published by the educational digital education platform can aggregate content from the original hardcopy, along with academic references, user-generated content, assignments, testing applications, as well as school specific syllabus, such as arrangement of classes, schedules and assignments, and information about teachers, into a comprehensive set of digital services and environment. As another example, a student used to take notes with pen and paper while reading paper textbooks may now making annotations or typing answers on his/her client devices. The notes taken by the student can be uploaded to and stored in a personal library managed on a per account basis by the digital education platform for publishing online or sharing with friends.

Together with the user-generated content, the platform also receives, in step 504, user-defined access rights from the first user for a plurality of users in the education social network with whom the first user would like to share the user-generated content, so that each of the plurality of users is associated with an access right selected by the first user for the user-generated content. As previously described, the social network engine 150 in the digital education platform 102 facilitates an education social network so that users can connect and communicate with each other. One particular form of interactions between users of the education social network is sharing user-generated content associated with a multilayered document created by various users while maintaining all references to the original core document.

After the user-generated content is uploaded, the digital education platform ingests the content and stores it in the user-generated content layer of the multilayered document. In order to share, the digital education platform next publishes user-generated content in step 506. For example, the digital education platform can make the content available for sharing at dedicated uniform reference locators (URLs) under the sharing service. The URL may be accessible by those users who are allowed access rights by the first user. Thus, other users reading the multilayered document in the education social network may access the user-generated content.

Subsequently in step 508, the digital education platform may receive a request from a second user of the digital education platform to access user-generated content created by the first user. In one embodiment, the request to share the user-generated content is an explicit request from the second user. Alternatively, the request can be implicitly triggered, for example, when the second user connects to the first user in the education social network. The digital education platform then determines in step 510 an access right associated with the second user for the user-generated content. The digital education platform may make a decision based on the access rights designated by the first user when uploading the user-generated content for sharing, in one embodiment. In another embodiment, the digital education platform may direct the request back to the first user for reconsideration and/or confirmation of granting access right to the second user. In response to a determination of the access right, the second user is granted access in step 512 to the user-generated content created by the first user.

For example, students taking a course can set up one or more groups together with instructors of the course. The instructors, such as a teacher or a teaching assistant, may distribute syllabus, master notes assignments, and unit tests only to the students within the group, which emulate a classroom environment in virtual space. Students, on the other hand, may choose to share their assignments, class notes, and annotations with other students inside or outside the groups, since the access rights are to be determined as needed by whoever creates the content.

Based on the business rules and licensing rights that govern the access of the shared layers of content, the digital education platform enables a variety of services that naturally integrate with the multilayered content document and the education social network. The following examples illustrate some of the service scenarios rendered possible by the digital education platform, such as asynchronous access and synchronous access. The asynchronous access mode further includes time-based sharing mode and streaming mode.

In the asynchronous access mode, a primary user identifies one or more layers of content within a multilayered document for sharing with a group of users selected from the primary user's social graph connections. The group of users sharing the layers of content from the primary user is defined as secondary users. When access rights are validated, the shared layers of content are made available to the secondary users. Once the secondary users get connected to the digital education platform and start eReading web sessions, the shared layers of content appears within the secondary users' eReading browser application. This approach to document sharing is asynchronous because the shared content layers are created beforehand by the primary user. The secondary users are granted access to the shared content layers for as long as their access rights are valid. During the time period, secondary users have access to the shared content layers at any time as the primary user updating the content.

For example, the asynchronous access mode can be used by a teacher to distribute and share assignments as a dynamic content layer in a multilayered digital textbook to students in the education social network. The teacher creates the assignments through the eReading browser application and adds the assignments to his or her personal library as a related content layer or a user-generated layer in reference to the multilayered digital textbook. As the creator and owner of the assignments, the teacher may also designates the access rights for the newly published content layer of assignments. For instance, the teacher may decide to share the assignments to certain members of the teacher's education social network, such as all students attending the teacher's class. As a result, those students who are accessing the multilayered digital textbook from the eReading browser application are presented with an additional layer of the teacher's assignments together with the HTML5 document pages.

While sharing the assignments, the teacher may edit and update the assignments as many times as necessary. Due to the dynamic nature of HTML5-based publishing, the multilayered document pages can be requested and downloaded to the client devices at any time. Whenever the assignments are updated, the publishing system may notify the eReading browser application on the client devices to refresh the current displayed document pages within the browser. Furthermore, the teacher can also customize the assignments or make specific versions of the assignments targeting various subgroups within the teacher's education social group, such as one or more students in a particular class.

Similarly, the asynchronous access mode is applicable for students to share their personal notes or other user-generated content within the education social network. This approach of creating and sharing a dynamic content layer is suitable for self-publishing within an existing multilayered document service.

In one embodiment, the primary user can specify access rights to enable time-based sharing when uploading the document content layers to the digital education platform. Time-based access rights can be defined by date (month, day, and year), time (hours, minutes, and seconds), user login time, or any other time related combinations. The digital education platform manages and enforces the time-based access rights for the primary user. As a result, access to the shared content layers by the secondary users is bound by the explicit time-based terms specified by the primary user. This access mode can be classified as time-based asynchronous access because secondary users are granted access to the shared content layers based on a predetermined publishing schedule set by the owner of the content layers.

For example, the teacher can create an assignment for the multilayered digital textbook through the eReading browser application and distribute it in the education social network using the asynchronous time-based access mode. The teacher creates the assignment through the eReading browser application and adds it to his or her personal library as a related content layer or a user-generated content layer in reference to the multilayered digital textbook. As the creator and owner of the assignment, besides determining the access rights of the students, the teacher can also determines the schedule for sharing the newly added content layer with the members of the teacher's education social network, for instance, at a particular time of day and for a particular time period. As a result, students accessing the multilayered digital textbook from the eReading browser application are presented with the additional layer of assignment only at the scheduled time of day and for the allocated time period.

The teacher may edit and update the already shared assignment as many times as necessary to assign to other students on a future schedule. In addition, the teacher can create interactive as well as non-interactive versions of the assignment. The interactive version requires the students to be connected to the digital education platform so that students' answers to the assignment are captured in real time, just like working on an assignment in a classroom. Whereas the non-interactive version of the assignment can be assigned to students as homework.

In another embodiment, the primary user identifies one or more layers of content in the multilayered document for streaming to secondary users. Similarly to other asynchronous access modes, user-generated content is normally uploaded to the digital education platform, stored in the user's personal content library in reference to the multilayered content document, synchronized as needed between the user's client devices and shared among the user's social connections. To enable streaming access, the primary user further redirects the user-generated content to a streaming channel, which can be accessed by the secondary users through their eReading browser applications. The streaming channel can be any container for live content to be streamed between connected users of the same document layer. This streaming access mode allows the primary user to send live feed of comments, notes or other forms of user-generated content to the secondary users as soon as the content is created and uploaded by the primary user. There can be more than one streaming channels initiated by different users within a multilayered content document.

For example, in the education social network, the streaming access mode allows a user (e.g. a student or a teacher) to create or select one or more layers within a multilayered content digital textbook as a streaming channel for sharing live user-generated data with other users. This model improves the support of establishing communications between subgroups or groups of users. Furthermore, streaming channels are particularly useful in establishing direct communications between students and teachers, opening up students-to-students, students-to-teachers, and teachers-to-students interactions. In this mode, a student would be able to create his or her own streaming channel that can be added to the multilayered document and shared with subgroups or groups of users. For example, by accessing a streaming channel within a multilayered content digital textbook, a student can post comments, asking teacher for help, ask a question to other students, answering questions, among other activities in real-time while maintaining references to the source documents.

In the synchronous access mode, the primary user shares all her activities in the eReading browser application with the secondary users. For instance, the document page requests initiated by the primary user's eReading browser application are shared with the secondary users, effectively imposing the same document page requests initiated by the primary user upon the eReading browser applications of the second users. As a result, the primary user dictates the nature and timing of the secondary users' activities during a synchronous session.

For example, in the education social network, the synchronized access mode allows a teacher to give an online presentation to all students in the class. The teacher first selects one or more layers in the multilayered digital textbook for synchronous sharing among a group of students. During the synchronous reading session, the teacher's document reading commands, such as going to previous page or next page, or jumping to a different page location, are shared among all the participating student sessions. The digital education platform executes these commands as if the commands have been initiated by all the eReading browser applications run by the teacher and the students, resulting in synchronized activities among all the connected students. As the initiator of the synchronized reading commands, the teacher determines the parameters applicable to the synchronized activities, such as the pace of reading and length of the lecture. At the same time, the teacher may share additional layers of content, such as master notes or related content in the multilayered digital textbook, in asynchronous streaming mode during the synchronous reading session.

In conclusion, the multilayered digital document extension is shifting the traditional deployment of digital publishing toward multi-dimensional digital publishing and reading platforms with integrated education and learning services. As the definition of what constitutes a textbook is evolving with the inclusion of additional content layers such as user-generated and social activities for example, markup language-based education platforms are now in the position to connect individual devices into a unified interconnected reading experience across all members of education social networks. As such, the integration of social network behavior with markup language-based digital publishing services is changing the definition of a document by opening it up to multiple layers of content aggregated into a new and enhanced social reading experience.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for sharing user generated content in a multi-layered document, the method comprising:
  receiving user-generated content associated with a multi-layered document created by a primary user, the multi-layered document comprising a core layer and one or more additional layers, wherein the core layer comprises pages of a publication, an additional layer includes user-generated content related in subject matter and placement to content of the core layer, and wherein the additional layer is associated with two or more groups of secondary users within an educational social network that are provided distinct subsets of the user-generated content for the additional layer based on distinct access rights assigned by the primary user to their corresponding groups, secondary users within a group defined based on a shared characteristic within a context of the educational social network;

receiving a request, from a viewing user, to access the multi-layered document;

identifying a group of secondary users to which the viewing user belongs;

receiving user-defined access rights, defined by the primary user of the additional layer for the identified group; and publishing a selected subset of the user-generated content within the additional layer for the viewing user in the multilayered document, the selected subset of the user-generated content that is published for display to the viewing user being determined in accordance with the received user-defined access rights associated with the identified group to which the viewing user belongs.

2. The method of claim 1, wherein the multilayered document is a textbook in markup language format and the additional layer comprises at least one of: a related content layer comprising supplemental academic material related in subject matter and placement to content of the core layer, an interactive layer, and an advertising layer comprising targeted advertisements for educational resources related in subject matter and placement to content of the core layer.

3. The method of claim 1, wherein secondary users within a group are defined based on a shared characteristic reflecting a similarity in at least one of: an academic standing, a level of academic skill, a level of academic preparation, academic interest, academic aptitude, an affiliation with an academic institution, and enrolment in an academic course.

4. The method of claim 1, wherein user-generated content comprises at least one of: highlights, underlines, assignments, comments, notes and questions associated with pages of the multilayered document.

5. The method of claim 1, wherein the access rights for the user-generated content comprise at least one of: read, write and re-share.

6. The method of claim 1, wherein the groups of secondary users within the educational social network comprise at least one of:

users enrolled in one of the primary user's classes, users having common majors as the primary user, teachers, users enrolled in a same school as the primary user, and academic authors.

7. The method of claim 1, wherein the user-defined access rights defined by the primary user define a mode for sharing the user-generated content with users of the identified group, as being a selected one of: an asynchronous mode that enables unidirectional communication of the user-generated content from the primary user to the secondary users in the identified group via the additional layer during a predefined duration of time after creation of the user-generated content by the primary user, a synchronous mode that enables unidirectional communication and synchronization of the user-generated content from the primary user to the secondary users in the identified group via the additional layer in real-time, and streaming mode of access that enables the secondary users of the identified group to interact with the primary user via the additional layer in real-time.

8. The method of claim 7, wherein the asynchronous access is time based.

9. A non-transitory computer-readable storage medium storing computer programs configured to execute on the computer processor, the computer program comprising:

receiving user-generated content associated with a multi-layered document created by a primary user, the multi-layered document comprising a core layer and one or more additional layers, wherein the core layer comprises pages of a publication, an additional layer includes user-generated content related in subject matter and placement to content of the core layer, and wherein the additional layer is associated with two or more groups of secondary users within an educational social network that are provided distinct subsets of the user-generated content for the additional layer based on distinct access rights assigned by the primary user to their corresponding groups, secondary users within a group defined based on a shared characteristic within a context of the educational social network;

receiving a request, from a viewing user, to access the multi-layered document;

identifying a group of secondary users to which the viewing user belongs;

receiving user-defined access rights, defined by the primary user of the additional layer for the identified group; and publishing a selected subset of the user-generated content within the additional layer for the viewing user in the multilayered document, the selected subset of the user-generated content that is published for display to the viewing user being determined in accordance with the received user-defined access rights associated with the identified group to which the viewing user belongs.

10. The storage medium of claim 9, wherein the multilayered document is a textbook in markup language format and the additional layer comprises at least one of: a related content layer comprising supplemental academic material related in subject matter and placement to content of the core layer, an interactive layer, and an advertising layer comprising targeted advertisements for educational resources related in subject matter and placement to content of the core layer.

11. The storage medium of claim 9, wherein secondary users within a group are defined based on a shared characteristic reflecting a similarity in at least one of: an academic standing, a level of academic skill, a level of academic preparation, academic interest, academic aptitude, an affiliation with an academic institution, and enrolment in an academic course.

12. The storage medium of claim 9, wherein user-generated content comprises at least one of: highlights, underlines, assignments, comments, notes and questions associated with pages of the multilayered document.

13. The storage medium of claim 9, wherein the access rights for the user-generated content comprise at least one of: read, write and re-share.

14. The storage medium of claim 9, wherein the groups of secondary users within the educational social network comprise at least one of: users enrolled in one of the primary user's classes, users having common majors as the primary user, teachers, users enrolled in a same school as the primary user, and academic authors.

15. The storage medium of claim 9, wherein the user-defined access rights defined by the primary user define a mode for sharing the user-generated content with users of the identified group, as being a selected one of: an asynchronous mode that enables unidirectional communication of the user-generated content from the primary user to the secondary users in the identified group via the additional layer during a predefined duration of time after creation of the user-generated content by the primary user, a synchronous mode that enables unidirectional communication and synchronization of the user-generated content from the primary user to the secondary users in the identified group via the additional layer in real-time, and streaming mode of access that enables the secondary users of the identified group to interact with the primary user via the additional layer in real-time.

16. The storage medium of claim 15, wherein the asynchronous access is time based.

17. A computer-implemented system for sharing user generated content in a multilayered document, the system comprising:
- a computer processor; and
- a non-transitory computer-readable storage medium storing computer programs configured to execute on the computer processor, the computer program comprising instructions for:
- receiving user-generated content associated with a multi-layered document created by a primary user, the multi-layered document comprising a core layer and one or more additional layers, wherein the core layer comprises pages of a publication, an additional layer includes user-generated content related in subject matter and placement to content of the core layer, and wherein the additional layer is associated with two or more groups of secondary users within an educational social network that are provided distinct subsets of the user-generated content for the additional layer based on distinct access rights assigned by the primary user to their corresponding groups, secondary users within a group defined based on a shared characteristic within a context of the educational social network;
- receiving a request, from a viewing user, to access the multi-layered document;
- identifying a group of secondary users to which the viewing user belongs;
- receiving user-defined access rights, defined by the primary user of the additional layer for the identified group; and
- publishing a selected subset of the user-generated content within the additional layer for the viewing user in the multilayered document, the selected subset of the user-generated content that is published for display to the viewing user being determined in accordance with the received user-defined access rights associated with the identified group to which the viewing user belongs.

18. The system of claim 17, wherein user-generated content comprises at least one of: highlights, underlines, assignments, comments, notes and questions associated with pages of the multilayered document.

19. The system of claim 17, wherein the groups of secondary users within the educational social network comprise at least one of: users enrolled in one of the primary user's classes, users having common majors as the primary user, teachers, users enrolled in a same school as the primary user, and academic authors.

20. The system of claim 17, wherein the access rights for the document layers comprise at least one of: read, write and re-share.

* * * * *